July 20, 1965  F. J. SACKLEY  3,195,815
DEVICES FOR COUNTING AND CONTROLLING CONSECUTIVE
OPERATIONS OF A MACHINE
Filed April 17, 1964  3 Sheets-Sheet 1

July 20, 1965 F. J. SACKLEY 3,195,815
DEVICES FOR COUNTING AND CONTROLLING CONSECUTIVE
OPERATIONS OF A MACHINE
Filed April 17, 1964 3 Sheets-Sheet 2

Inventor
Frederick John Sackley
By
Tennis, Edmonds, Morton, Taylor & Adams
Attorneys United States Patent Office 3,195,815
Patented July 20, 1965

3,195,815
DEVICES FOR COUNTING AND CONTROLLING CONSECUTIVE OPERATIONS OF A MACHINE
Frederick John Sackley, Kent, England, assignor to Vickers-Armstrongs (Engineers) Limited, London, England, a British company
Filed Apr. 17, 1964, Ser. No. 360,627
Claims priority, application Great Britain, Apr. 25, 1963, 16,407/63
10 Claims. (Cl. 235—132)

This invention relates to devices for counting and controlling consecutive operations of a machine, the invention being concerned with repeat counting devices for the control of machines operable to perform repeated cyclic working operations.

In accordance with the invention there is provided a repeat counting device for controlling a cyclically operable machine to enable a predetermined number of cyclic operations of the machine to be included in a desired sequence, said device comprising a pivotally mounted toothed sector, a driving element operable in timed relationship with the cyclic operations of the machine and arranged mechanically to impart to said toothed sector, angular step-wise movements each corresponding to a cyclic operation of the machine, and means for presetting the number of step-wise movements to be made by said sector during its angular travel from a start position, said sector being arranged, during normal operation, to return automatically to its start position for a repetition of the desired sequence of cyclic operations of the machine.

The device is particularly useful when employed in conjunction with a one-revolution clutch for controlling the cyclic operations of a machine, but it will be appreciated that this mode of application is given as one particular example only of how the control device can be employed.

Figure 1:
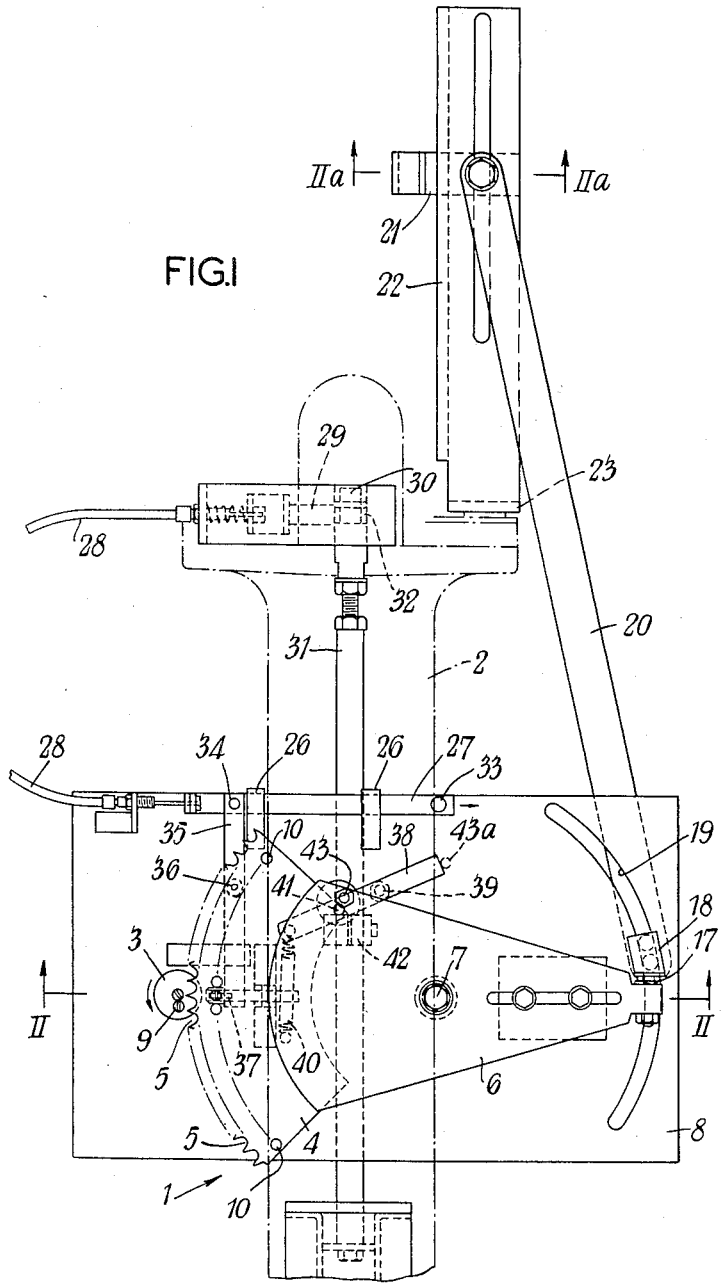
Figure 2:
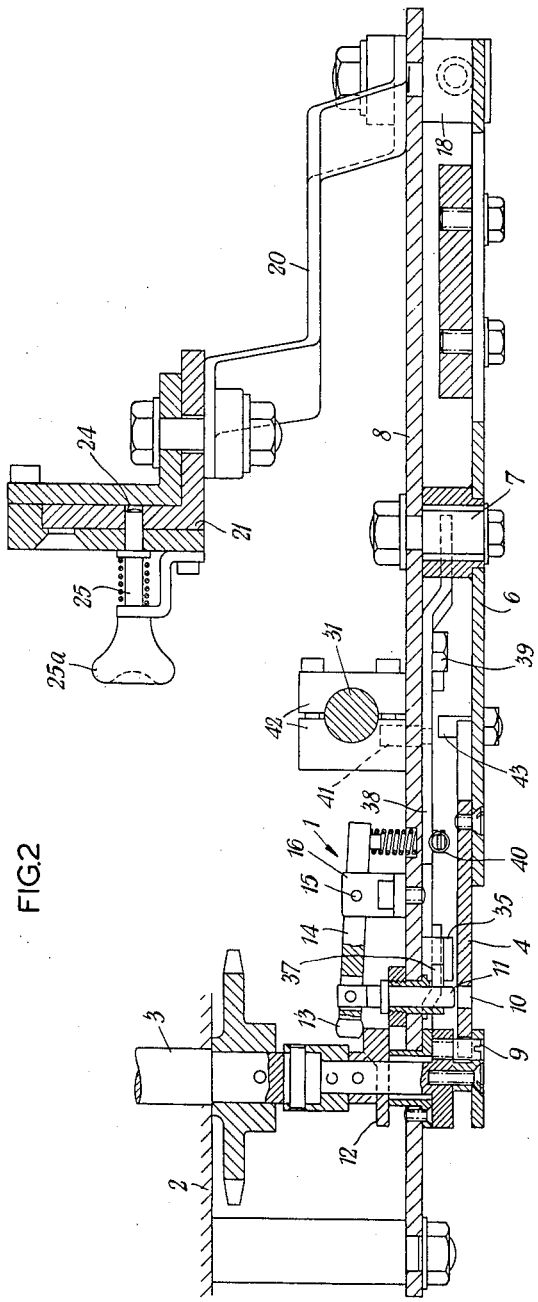
Figure 3:
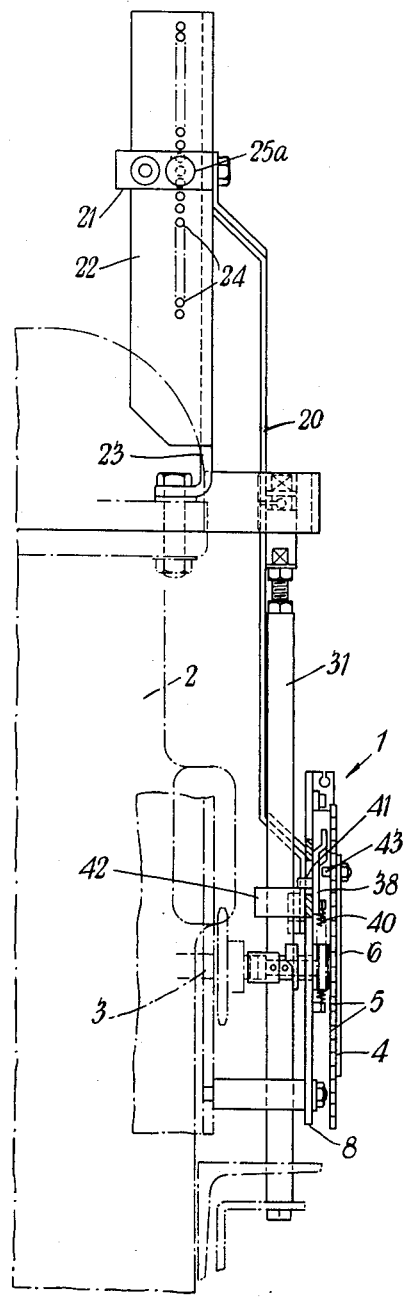

For a better understanding of the invention and to show how it may be carried into effect, an embodiment thereof will now be described, by way of example, with reference to the accompanying drawings, in which:

FIGURE 1 is a front view of a repeat counting device;
FIGURE 2 is an enlarged horizontal sectional view taken partly along the line II—II of FIGURE 1, and partly along the line IIc—IIc of FIGURE 1, and
FIGURE 3 is a side view of the device.

Referring to the drawings, the embodiment comprises a repeat counting device indicated generally at 1 suitable for controlling the cyclic operations of a wire stitching machine. In the figures of the drawings, only those parts of the machine are indicated insofar as is necessary to assist in an understanding of the repeat counting device. Thus, the machine has a frame, part of which is indicated at 2, and a drive shaft 3 operatively associated with a one-revolution clutch of which a driven shaft is arranged to drive the functional members, such as stitch forming and driving elements, of the machine. When the machine is set in motion, the one-revolution clutch can be engaged to effect a complete cycle of operation of the machine. The repeat counting device 1 is used in conjunction with the one-revolution clutch and can be set to permit the machine to perform a given member of cycles of operation and is adapted automatically to re-set itself for repetition of the predetermined number of cyclic operations.

The counting device 1 comprises a pivoted sector 4 formed along its curved periphery with a series of teeth 5, there being, for example, thirty teeth, the spacing between each two adjacent teeth representing a unit operation of the machine. Means is provided for pre-setting the sector 4 to enable it to operate over the required number of unit arcs corresponding to the required number of operative cycles of the machine. The toothed sector 4 is carried by a sector-plate 6 mounted for rocking movement about a pivot 7 carried by a vertically disposed back-plate 8. The teeth 5 of the sector 4 are arranged to be engaged by a driving pin 9 projecting eccentrically from the end of the drive shaft 3 of the machine so that during each revolution of the driving pin 9 the sector 4 will be moved through one unit arc or step. The toothed sector 4 is movable between an initial start position, which is adjustable, and a stop position which, in the present embodiment, is relatively fixed. The sector 4 is normally biased by the moment thereof about the pivot 7 of the sector-plate 6, towards the start position.

The sector 4 is formed also with an arcuate series of holes 10, there being a hole 10 opposite each tooth 5 of the sector. The back-plate 8 carries a locking pin 11 which is mounted for axial sliding movement in a direction perpendicular to the back-plate. During each rotation of the driving shaft 3, the locking pin 11 is movable from a retracted position, as shown in FIGURE 2, into a projected position so that when the driving pin 9 has rotated to lift and pivot the toothed sector 4 through one step or unit arc, the locking pin 11 will engage in a hole 10 of the plate, to hold the sector 4 in position for a period of time sufficient to enable the required operating cycle of the machine to take place. For operating the locking pin 11, the driving shaft 3 has secured to it a rotary cam 12 engaged by a cam follower roller 13 carried by a spring-loaded lever 14 pivotally mounted at 15 in a bracket 16 secured to the back-plate 8. The cam lift is such that the locking pin 11 is caused to engage in a hole 10 when each successive hole 10 is brought into register with the pin, and to be withdrawn from a hole when the driving pin 9 is next in a position to move the sector 4 forward one step.

The sector-plate 6 has at its reduced end remote from the toothed sector 4, an abutment 17 engageable with a setting block 18 adjustable in position along an arcuate slot 19 formed in the back-plate 8, to determine the angular movement of the sector-plate according to the required number of unit arcs over which the toothed sector is to operate. The setting block 18 thus determines the starting position of the sector 4, and is adjustable in position by an upwardly extending bar 20 having at its upper end a slide 21 movable vertically over a calibrated scale plate 22 carried by a bracket 23 bolted to the machine frame. The scale plate 22 is formed with a vertical series of holes 24 corresponding to the number of teeth 5 on the sector 4. The slide 21 has a spring-loaded selector pin 25 operated by a hand-knob 25a and engageable selectively in the holes 24 of the scale plate, to hold the slide 21 releasably in adjusted position. When the pin 25 is released from the scale plate, the slide can be moved to a selected hole to adjust the location of the setting block depending upon the required start position of the toothed sector 4 and the number of unit arcs through which the sector 4 is moved during each complete angular movement from the start position to the stop position. The slide 21 is formed with an aperture 26 through which calibration numbers engraved in the scale plate opposite the holes 24, are visible, the arrangement facilitating the selection of the desired hole 24 and thereby the adjustment of the slide 21.

The back-plate 8 is provided with a guide-way constituted by bearing brackets 26 for a horizontally slidable link 27 operatively connected at one end, as by a flexible cable 28, to a spring influenced locking bolt 29 which is engageable with a clutch bolt 30. The clutch bolt 30 is operated by a control pedal (not shown) and the arrangement is such that, when the machine is switched on and the clutch pedal is depressed, the clutch bolt 30 will be pulled down by a spring-loaded clutch rod 31, thereby to engage the one-revolution clutch so that the driving pin 9 commences to rotate and to drive the toothed sector 4. When the clutch bolt 30 is pulled down, the locking bolt 29 is moved forward by its spring into an annular groove 32 in the clutch bolt, so that the latter is held down until the driving pin 9 has moved the toothed sector 4 stepwise through the preset number of unit arcs. During the final step or arcuate movement, the sector 4 is thrust against a release pin 33 mounted on the horizontal link 27, so that the link 27 is displaced to pull the locking bolt 29 out of the groove 32 in the clutch bolt 30. The clutch bolt 30 is thus freed to be returned by the spring-loaded clutch rod 31, thereby to disengage the clutch and to prevent further rotation of the driving pin 9.

The link 27 which carries the release pin 33, is provided also with a catch pin 34 adapted to operate a pivoted lever 35 mounted for pivotal movement about a pivot 36. The arrangement is such that when the link 27 is moved to disengage the clutch, the lower end of lever 35 is swinging into engagement with a second catch pin 37 which is fixed to the locking pin 11. The locking pin 11 is thereby held in its retracted position (FIGURE 2) away from the toothed sector 4 so that the latter can return to its preset start position in which the abutment 17 at the opposite reduced end of the sector-plate 6 engages the pre-adjusted setting block 18. The lever 35 is then disengaged from the second catch pin 37 to enable the locking pin 11 to engage in the hole 10 disposed opposite the pin 11 when the sector 4 comes to rest in the start position.

The operating pedal should not be held down for any protracted period, a quick depression and release of the pedal being required to set the mechanism of the control device in motion for initiation of an operating sequence. Once set in motion, the mechanism will continue to reset itself automatically, without aid from the operating pedal, the toothed sector 4 returning, at the end of each preset angular movement thereof, to the start position, for a repetition of its angular movement through a number of unit arcs corresponding to the required operating cycles of the machine.

The control device 1 is provided, however, with safety means to avoid damage to the mechanism in the event that the operator should inadvertently retain pressure on the operating pedal until after an operating sequence has been completed. The safety means comprises a safety lever element 38 pivotally mounted at 39 on the back-plate 8 and provided at one end with a spring 40 so arranged that a safety pin 41 carried by and extending laterally from said lever element 38, is urged against a stop comprising two blocks 42 mounted on the spring-loaded clutch rod 31. The sector plate 6 also carries a lateral projecting locking pin 43 which, during the completion of the angular travel of the sector-plate 6 and the associated toothed sector 4, wipes across said safety lever element 38 and rocks said lever element until the locking pin 43 passes over the free end of the lever element into the position indicated by dotted lines at 43a in FIGURE 1. The toothed sector 4 is now at the end of its travel and is prevented from returning to the start position by engagement of the pin 43 against the end of the safety lever element 38. The toothed sector 4 is thus held out of engagement with the driving pin 9 and the latter can idle around without affecting the toothed sector.

When the operator becomes aware that the machine is not operating normally and the operating pedal is allowed to rise, the safety lever element 38 will be rocked by the blocks 42 on the clutch rod 31, to move the end of said lever element 38 away from the locking pin 43a. In this manner, the sector plate and toothed sector are released for return to the start position.

What I claim is:

1. A repeat counting device for controlling a cyclically operable machine to enable a predetermined number of cyclic operations of the machine to be included in a desired sequence, said device comprising a support, a toothed sector, mounting means pivotally mounting said toothed sector in said support including a pivot secured in said support, a sector plate pivotally mounted on said pivot and carrying said toothed sector, a driving element operable in timed relationship with the cyclic operations of the machine and mechanically engageable with said toothed sector to impart thereto a preset number of angular stepwise movements each corresponding to a cyclic operation of the machine, means for presetting the number of stepwise movements to be made by said toothed sector during its angular travel from a start position to a stop position, said presetting means comprising a setting block mounted in said support for movement along a curved path, adjustable means for securing said setting block in adjusted position along said path according to the number of stepwise movements to be made by the toothed sector, an abutment at the end of said sector plate remote from said toothed sector, said abutment being engageable with said setting block to determine the start position of the angular travel of the toothed sector and associated sector plate in accordance with the adjusted position of said setting block, and means for returning said toothed sector from said stop position to said start position for a repetition of the desired sequence of cyclic operations of the machine.

2. A device according to claim 1, wherein said presetting means further comprises a calibrated scale plate, a slide movable over said calibrated scale plate, a bar operatively connected at one end thereof to said slide and operatively connected at the other end thereof to said setting block, and releasable retaining means on said slide and engageable with said calibrated scale plate for holding said slide in an adjusted position on said calibrated scale plate.

3. A device as claimed in claim 2, wherein said retaining means comprises a spring-loaded plunger element mounted in said slide and engageable selectively in one of a series of holes formed along said calibrated scale plate and corresponding in number to the teeth on said toothed sector, and a datum mark on said scale readable against the calibrations of said calibrated scale plate.

4. A repeat counting device for controlling a cyclically operable machine to enable a predetermined number of cyclic operations of the machine to be included in a desired sequence, said device comprising a back-plate for attachment to the machine to be controlled by the repeat counting device, a pivot carried by said back-plate, a sector plate having an enlarged portion at one end and a reduced portion at the opposite end, said sector plate being mounted on said pivot for angular rocking movement in a vertical plane, a toothed sector secured to said sector plate, a drive shaft mounted in said back-plate for rotation in timed relationship with the cyclic operations of the machine, a mechanical driving connection between said drive shaft and the teeth of said toothed sector for imparting to said toothed sector and said sector plate, a preset number of angular stepwise movements each corresponding to a cyclic operation of the machine, means for presetting the number of stepwise movements to be made by said toothed sector during the angular travel of said toothed sector and said sector plate from a start position to a stop position, said back plate having an arcuate slot formed therein, said presetting means including a setting block movable along said arcuate slot which defines a path of adjustment of the setting block, an abutment mounted on the reduced end portion of the sector plate and engageable with said setting block, and adjustment means for holding said setting block in adjusted position along said arcuate slot to determine the start position of the angular travel of said toothed sector and said sector plate.

5. A device according to claim 4, including mechanism for releasably holding the toothed sector and said sector plate in position following each stepwise movement to provide a dwell period in said angular travel thereof corresponding to an operating cycle of the machine.

6. A device according to claim 5 wherein said holding mechanism comprises a locking pin mounted in the back-plate for movement to and from the toothed sector in timed relationship with the rotation of the drive shaft, said toothed sector being formed with an arcuate series of holes including one hole for each tooth of said toothed sector, and means being provided for displacing said locking pin following each angular stepwise movement of said toothed sector, to engage in successive holes of the series to hold the toothed sector and said sector plate stationary for the required dwell period.

7. A device according to claim 6, wherein the means for displacing said locking pin comprises a rocker arm pivotally mounted on said back-plate, a cam follower on said rocker arm, and a rotary cam operated by said drive shaft and engaged by said follower, said rotary cam having a cam lift for pivoting said rocker arm to displace said locking pin into a hole of said toothed sector as each successive hole is brought into register with the locking pin and to withdraw the locking pin from the hole when the drive shaft is next operated to move the toothed sector forward one step.

8. In combination, a machine having elements operable to perform repeated cyclic working operations, a drive including a clutch and associated clutch bolt for operating said machine elements, a repeat counting device for controlling said machine to enable a predetermined number of cyclic operations of the machine to be included in a desired sequence, said repeat counting device comprising a back-plate secured to the machine frame, a sector plate pivotally mounted on said back-plate for angular rocking movement, a toothed sector on said sector plate, a drive shaft mounted in said back-plate for rotation in timed relationship with the cyclic operations of said machine, a mechanical driving connection between said drive shaft and the teeth of said toothed sector for imparting to said toothed sector and said sector plate a preset number of angular stepwise movements each corresponding to a cyclic operation of said machine, means for presetting the number of stepwise movements to be made by said toothed sector during the angular travel of said toothed sector and said sector plate from a start position to a stop position, a slide link operatively connecting said repeat counting device to the clutch bolt of the drive of said machine, said link being mounted on said back-plate for sliding movement between two end positions, in one of which positions the drive of said machine will be inoperative and in the other of which positions the drive of the machine will be engaged to perform a desired working cycle, a spring-influenced locking bolt engageable with the clutch bolt of said machine, cable means at one end of said slidable link operatively connecting said link to said locking bolt, and a release pin carried by said slide link and engageable by said toothed sector during the final stepwise movement thereof for displacing said link to move said locking bolt out of engagement with said clutch bolt so that the clutch is disengaged to prevent further rotation of the driving pin.

9. The combination according to claim 8, wherein the slide link which carries the release pin is provided also with a first catch pin adapted to operate lever means for holding the locking pin associated with the toothed sector in a retracted position away from the toothed sector so that upon completion of the required sequence of steps of the toothed sector, the latter will be free to return to the start position as determined by the pre-adjusted setting block.

10. The combination according to claim 9, including safety means comprising a safety lever element, a safety pin extending from said safety lever, a stop engaged by said safety pin and carried by a member for operating said clutch, means pivotally mounting said safety lever element in said back-plate and urging said lever element against said stop, a locking element provided on said back-plate and operable, during completion of the angular travel of said sector plate and said toothed sector, to rock said lever element until the locking element of the sector plate engages an end part of said safety lever element to prevent the toothed sector returning to the start position and to prevent normal operation of the machine until the clutch operating member is displaced to disengage said safety lever element from the locking element to permit return of the toothed sector and the sector plate to the start position.

References Cited by the Examiner

UNITED STATES PATENTS

| | | | |
|---|---|---|---|
| 1,572,932 | 2/26 | Jones | 235—132 |
| 1,908,626 | 5/33 | Ford | 235—132 X |
| 2,041,943 | 5/36 | McClain et al. | 235—132 |
| 2,161,459 | 6/39 | De May | 235—132 X |
| 2,339,603 | 1/44 | Hoffman | 192—139 |

LEO SMILOW, *Primary Examiner.*